United States Patent
Dion et al.

(10) Patent No.: US 11,933,293 B2
(45) Date of Patent: Mar. 19, 2024

(54) VESSEL PRESSURE TESTING SYSTEM

(71) Applicant: Graco Minnesota Inc., Minneapolis, MN (US)

(72) Inventors: Matthew P. Dion, St. Francis, MN (US); Patrick J. Clint, Minnetonka, MN (US); Joseph A. Daniski, Minnetonka, MN (US); Grant S. Schluender, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 111 days.

(21) Appl. No.: 17/608,946

(22) PCT Filed: May 5, 2020

(86) PCT No.: PCT/US2020/031487
§ 371 (c)(1),
(2) Date: Nov. 4, 2021

(87) PCT Pub. No.: WO2020/227304
PCT Pub. Date: Nov. 12, 2020

(65) Prior Publication Data
US 2022/0299022 A1  Sep. 22, 2022

Related U.S. Application Data

(60) Provisional application No. 62/843,523, filed on May 5, 2019.

(51) Int. Cl.
*F04B 51/00* (2006.01)
*F04B 49/06* (2006.01)
*F04B 49/08* (2006.01)

(52) U.S. Cl.
CPC ............ *F04B 51/00* (2013.01); *F04B 49/065* (2013.01); *F04B 49/08* (2013.01); *F04B 2205/05* (2013.01)

(58) Field of Classification Search
CPC ............ F04B 9/123–1276; F04B 23/02; F04B 49/065; F04B 49/08; F04B 49/22; F04B 51/00; F04B 2205/05; F04B 2205/063
See application file for complete search history.

(56) References Cited

U.S. PATENT DOCUMENTS 4,480,462 A    11/1984  Miller
5,626,467 A *   5/1997  Cantley .................. F04B 53/16
                                                         417/397

(Continued)

FOREIGN PATENT DOCUMENTS

DE         19860466 C1 *  6/2000  .............. F01L 23/00
GB          2341648 A  *  3/2000  .............. F01L 23/00

(Continued)

OTHER PUBLICATIONS

International Preliminary Report on Patentability from PCT Application Serial No. PCT/US2020/031487, dated Nov. 18, 2021, 12 pages.

(Continued)

*Primary Examiner* — Alexander B Comley
(74) *Attorney, Agent, or Firm* — Kinney & Lange, P.A.

(57) ABSTRACT

In a control system for operating a pump, the pump is pneumatically driven to pump hydraulic fluid to pressurize a closed vessel. The control system includes inlet and outlet ports, a pneumatic regulator, a pressure transducer, and control circuitry. The inlet and outlet ports are configured to receive inlet and output outlet pressurized air, respectively. The outlet pressurized air powers the pump. The pneumatic regulator is disposed between the ports, and configured to receive the inlet air and output the outlet air. The pneumatic regulator includes a valve that modulates pneumatic pressure based on a control signal. The pressure transducer provides a hydraulic pressure signal indicative of pressure at the output of the pump. The control circuitry is configured (Continued)

to adjust a parameter of the control signal based on this hydraulic pressure signal, and output the control signal to the pneumatic regulator to indirectly control operation of the pump.

8 Claims, 7 Drawing Sheets

(56) References Cited

U.S. PATENT DOCUMENTS

| | | | |
|---|---|---|---|
| 6,386,841 B1 * | 5/2002 | Probst | F01L 23/00 91/309 |
| 6,503,066 B1 * | 1/2003 | Cantley | F04B 9/125 417/403 |
| 6,826,957 B2 | 12/2004 | Martone et al. | |
| 7,594,424 B2 | 9/2009 | Fazekas | |
| 8,731,849 B2 | 5/2014 | Westra et al. | |
| 9,429,493 B2 | 8/2016 | Halliwill | |
| 9,677,550 B2 * | 6/2017 | Bauck | F04B 9/123 |
| 9,709,456 B1 | 7/2017 | Clover | |
| 2013/0189122 A1 * | 7/2013 | De Talhouet | F04B 15/02 417/63 |
| 2014/0093395 A1 * | 4/2014 | Leavy | F04B 35/008 417/26 |
| 2015/0192115 A1 * | 7/2015 | Seith | F04B 43/073 417/46 |
| 2016/0334300 A1 * | 11/2016 | Hilpert | G01M 3/2876 |

FOREIGN PATENT DOCUMENTS

| | | |
|---|---|---|
| JP | 2000320451 A * | 11/2000 |
| JP | 2004225620 A * | 8/2004 |
| JP | 2004225620 A | 8/2004 |

OTHER PUBLICATIONS

International Search Report and Written Opinion from PCT Application Serial No. PCT/US2020/031487, dated Aug. 27, 2020, 17 pages.

Communication Pursuant to Article 94(3) EPC for EP Application No. 20729338.2, dated Feb. 2, 2023, 5 pages.

* cited by examiner

VESSEL PRESSURE TESTING SYSTEM

CROSS-REFERENCE TO RELATED APPLICATION(S)

This application claims priority to U.S. Provisional Patent Application No. 62/843,523, the entirety of which is herein incorporated by reference.

BACKGROUND

The present invention relates generally to systems for pressurizing vessels, and more particularly to pressurizers in which a pneumatically driven pump forces a fluid into a test vessel to progressively raise the hydraulic pressure within the vessel to test the integrity of the vessel.

Pressurizers are used to pressurize a fluid, such as a liquid or gas, within a closed vessel. In particular, pressurizers are often used in hydrostatic testing to evaluate the pressure performance of valves and pressure containers. In other applications, pressurizers are also used for a wide range of bolt tensioning and/or torqueing, botanical oil extraction, feeding hydraulic actuators, high pressure pasteurization, and laboratory research. It is desirable for a pressurizer to rapidly, precisely, and reliably pressurize a vessel to a selected target pressure, without overshooting.

SUMMARY

In one aspect, the present disclosure is directed toward a pressure testing system for pressurizing and testing a test vessel. The pressure testing system includes a pump, a hydraulic pressure transducer, and a pneumatic control unit. The pump is driven by pneumatic pressure, and has a pressurized hydraulic fluid outlet to the test vessel. The hydraulic pressure transducer is coupled to the hydraulic fluid outlet to generate a hydraulic pressure signal indicative of hydraulic pressure at the test vessel. The pneumatic control unit is configured to drive the hydraulic pump via a supply of pressurized air, and includes a pneumatic regulator and control circuitry. The pneumatic regulator disposed to modulate a pneumatic pressure of the pressurized air toward a target pneumatic pressure. The control circuitry is configured to receive the hydraulic pressure signal, set the target pneumatic pressure based on a target hydraulic pressure at the test vessel, and iteratively increase the target pneumatic pressure until hydraulic pressure signal exceeds the target hydraulic pressure.

In another aspect, the present disclosure is directed to a method of operating a pneumatic testing system including a pump and a pneumatic regulator. The method includes specifying a test pressure, determining an output pressure of the pneumatic regulator, and modulating pressurized air output from the pneumatic regulator, to the pump, to drive the pump. The method further includes outputting hydraulic fluid from the pump to a test vessel, and sensing a hydraulic pressure output by the pump to the test vessel, via a hydraulic pressure transducer. The sensed hydraulic pressure is compared to the test pressure, and the determined output pressure of the pneumatic regulator is increased until the sensed hydraulic pressure is not less than the test pressure.

In still another aspect, the present disclosure is directed to a control system for operating a pump. The pump is pneumatically driven to pump hydraulic fluid to pressurize a closed vessel. The control system includes inlet and outlet ports, a pneumatic regulator, a pressure transducer, and control circuitry. The inlet and outlet ports are configured to receive inlet and output outlet pressurized air, respectively. The outlet pressurized air powers the pump. The pneumatic regulator is disposed between the ports, and configured to receive the inlet air and output the outlet air. The pneumatic regulator includes a valve that modulates pneumatic pressure based on a control signal. The pressure transducer provides a hydraulic pressure signal indicative of pressure at the output of the pump. The control circuitry is configured to adjust a parameter of the control signal based on this hydraulic pressure signal, and output the control signal to the pneumatic regulator to indirectly control operation of the pump.

The present summary is provided only by way of example, and not limitation. Other aspects of the present disclosure will be appreciated in view of the entirety of the present disclosure, including the entire text, claims, and accompanying figures.

Figure 1:
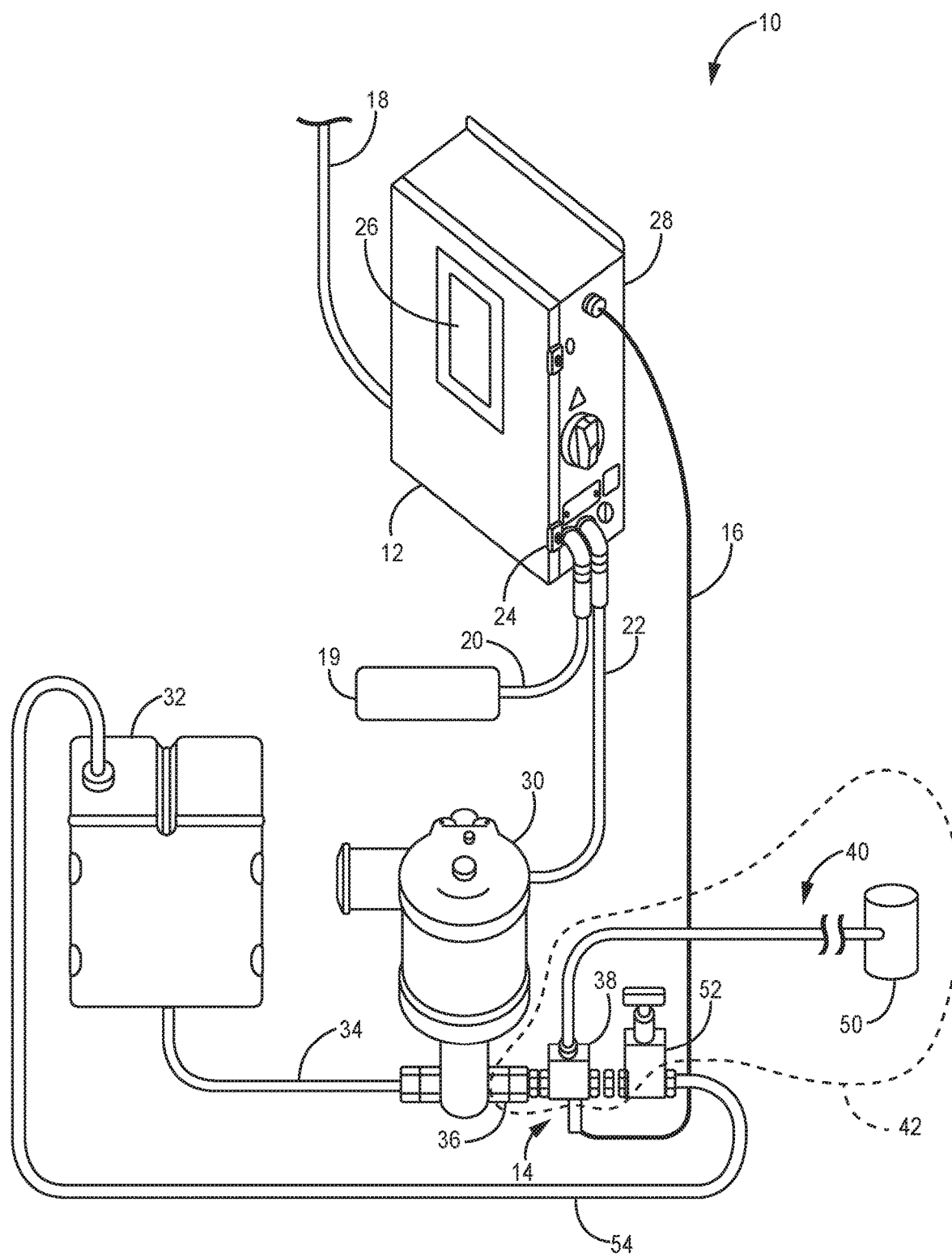
FIG. 1 is a schematic view of a pressure test system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure is directed to a system for testing the performance and integrity of a pressure vessel under high pressure conditions. The system and methods set forth below allow vessels such as containers, pipes, and valves to be supplied with fluid at a precisely specified test pressure. The system is then capable both of precisely achieving and maintaining the desired pressure for vessel burst testing, and of testing for and identifying fluid leaks in the vessel through pressure decay.

FIG. 1 is a schematic system view of pressure test system 10. As described hereinafter, pressure test system 10 builds fluid pressure within a test vessel to a target pressure value for testing purposes. Various pressurizable vessels must be capable of withstanding high hydraulic pressures in their working life. For example, containers, pipes, hubs, manifolds, valves, and other components forming pathways and/or interior space for transporting and/or containing high pressure fluid (referred to herein as vessels), in some applications, must be tested to verify that the vessel can withstand high pressure to ensure integrity of the vessel. In the case of actuatable components such as valves, it can be necessary to test the integrity of the vessel in operation, e.g. as a valve is opened or closed. These various forms of testing can be done as part of manufacturing and/or during the service life of the vessel. Two main types of testing are contemplated herein: burst tests and leak tests.

In burst testing, pressure test system 10 builds hydraulic pressure in the test vessel to a target value, then maintains that pressure to ensure that the vessel does not rupture or otherwise fail at a desired operational pressure, Any form of rupture, measured pressure drop or dip, and/or inability to maintain the target pressure is indicative of a compromised component and constitutes burst test failure.

In leak testing, pressure test system 10 pressurizes the test vessel to a target value as described above, but then closes the hydraulic system (e.g., shutting off of the pump supplying hydraulic fluid under pressure and/or closing of valves) to fluidly isolate the test vessel. After closure of the system, any decrease in pressure, however small, may indicate a leak in the system.

Testing of both kinds can be done at a manufacturing facility, at a testing facility, and/or in the field. Pressure test system 10 is not intended to move large amounts of hydraulic fluid. Rather, the system is intended to quickly and accurately build hydraulic pressure in a closed system to a precise level for the purpose of pressure testing, and then release the hydraulic fluid once testing is complete. Hydraulic fluid is preferably used for testing because liquid under pressure does not compress to store energy, unlike gas, and thus the risk of damage or injury in the event of leak or rupture of a vessel is minimized The present disclosure includes a control system for managing pressure testing. The control system is suited for benchtop testing of components, although other testing environments are possible.

Pressure test system 10 includes pneumatic control unit 12 and hydraulic pressure transducer 14. Generally, pneumatic control unit 12 drives and controls operation pump 30 to pressurize a test workpiece identified here as vessel 50, while hydraulic pressure transducer 14 monitors vessel pressure.

Pneumatic control unit 12 includes housing 28 and interface 26. Housing 28 can be a rigid box or other shaped enclosure formed, e.g. of metal or other structurally rigid material. Housing 28 can serve as a support structure that other components of pressure test system 10 can be mounted to, connected to, or contained within. Pneumatic control unit 12 includes pneumatic ports 24 extending through and/or mounted on housing 24. Pneumatic ports 24 inlets and outlets for the flow of pressurized air. More specifically, pneumatic port 24 provides an inlet for pressurized air from pneumatic air source 19 through pneumatic input 20, and an outlet for pneumatic output 22 to convey pressurized air from pneumatic control unit 12 to pump 30, as described in greater detail hereafter. Pneumatic input 20 can, for example, be a hose. Pneumatic air source 19 can, for example, be a tank of pressurized air and/or a compressor pump, among other options. Pneumatic air source 19 can be a removable/replaceable air source, or an integral part of pressure test system 10. Air source 19 can for example supply air at 100 psi, at 125 psi, or lower or higher pressures, amongst other options. Pressurized air output from the outlet port to pump 30 via pneumatic ports 24 and out pneumatic output 22 operates pump 30.

As noted above pneumatic control unit 12 includes interface 26. In the illustrated embodiment, interface 26 is a human operator interface mounted on housing 28 that can include a screen, touchscreen, button(s), dial(s), switch(es), light(s), and/or other components for representing information and/or receiving user input including test parameters and results. In alternative embodiments, pneumatic test system 10 can use a generic user interface 26 such as a connected computer or wireless smart device configured to receive and transmit control parameters and test data to and from pneumatic control unit 12.

Pressure test system 10 also includes hydraulic pressure transducer 14, which can, for example, be a strain gauge capable of producing a pressure reading representing a hydraulic pressure output of the pump 30. Pneumatic control unit 12 drives pump 30 (as described hereinafter), thereby adjusting the hydraulic pressure generated by pump 30. Hydraulic pressure transducer 14 monitors this hydraulic pressure, and provides the sensed pressure as a data input to pneumatic control unit 12. In the illustrated embodiment, hydraulic pressure transducer 14 is connected to housing 28 by signal line 16. Although the signal line 16 is shown as a physical line (e.g., a wire) in this embodiment, signal line 16 can more generally be any appropriate signal transmission means suitable for conveying signals from the hydraulic pressure transducer 14 to control circuitry of the pneumatic control unit 12, including a wireless communication channel (e.g., using short range, WiFi, or radio frequency signals)

Pressure test system 10 further includes hydraulic fluid supply 32. Hydraulic fluid can be water, but more generally various other types of preferably substantially incompressible liquids can be used. Hydraulic fluid supply line 34 conveys the hydraulic fluid from hydraulic fluid supply 32 to the inlet of pump 30. The pump 30 can draw the hydraulic fluid from the hydraulic fluid supply 32 and through the fluid supply line 34. Hydraulic fluid output line 36 conveys the hydraulic fluid from the outlet of pump 30 to a hub 38. Hub 38 is a manifold or junction that can include a port or other access point to allow hydraulic pressure transducer 14 to measure the hydraulic pressure of the fluid output by pump 30. Test line 40 and relief valve 52 branch from hub 38. Test vessel 50 receives hydraulic fluid for pressure testing from pump 30 via test line 40 and hub 38. While the illustrated embodiment depicts a single hub 38 used to fluidly connect the aforementioned components, multiple hubs or no hub may be used in various other embodiments. More generally, the output line 36, hub 38, test line 40, vessel 50, and the relief valve 52 are all part of a hydraulic test circuit 42 that is put under pressure by the pump 30. A hydraulic test circuit, as used herein, can be any hydraulically closed system downstream of a high pressure pump, closed except for any unexpected/unwanted leaks or ruptures. Aside from any fluid escaping through vessel 50 (e.g. from leakage or rupture) or the opening of the relief valve 52, hydraulic test circuit 42 is hydraulically closed such that the pumping of hydraulic fluid into the hydraulic test circuit 42 builds pressure and does not allow the outflow of hydraulic fluid. Hydraulic pressure transducer 14 reports the pressure or hydraulic fluid within this test circuit. Thus, pump 30 can pull hydraulic fluid from the hydraulic fluid supply 32 and force it into the hydraulic test circuit 42 to build pressure that can be measured by the hydraulic pressure transducer 14 to test whether the test vessel 50 can withstand a desired test pressure. Test vessel 50 can be any type of vessel used in fluid handling and for which assurance of high pressure integrity is desired.

Figure 2:
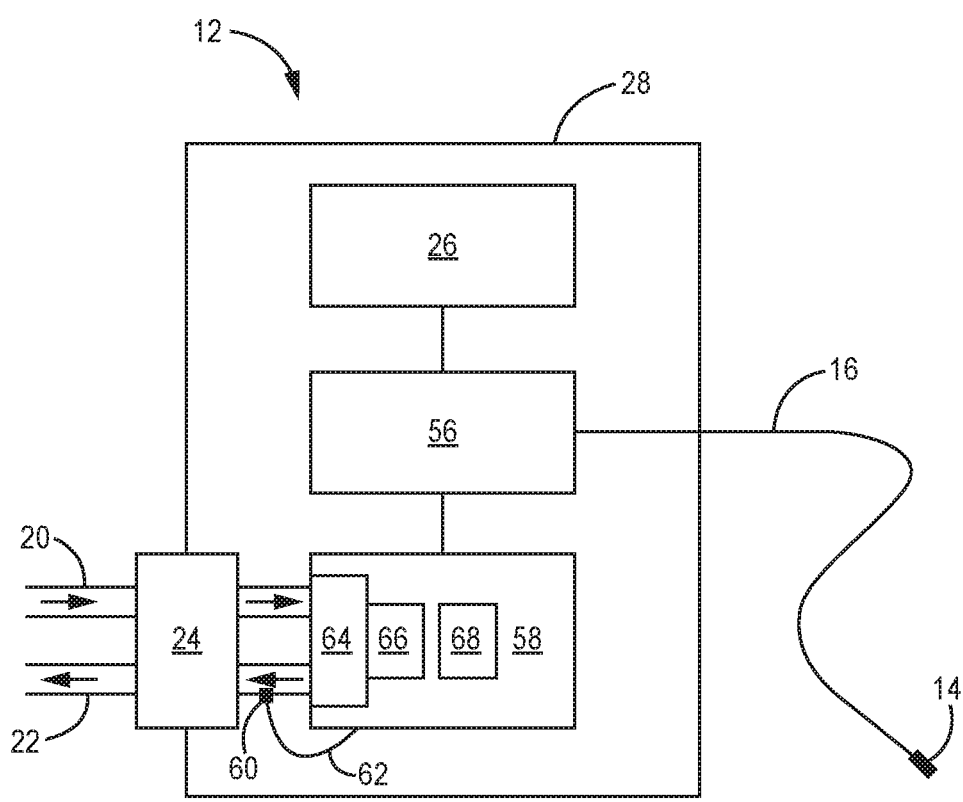
FIG. 2 is schematic view of a pneumatic control unit of the pressure test system of FIG. 1.

FIG. 2 is a schematic view illustrating further details of pneumatic control unit 12. In particular, the view of FIG. 2 shows internal components of pneumatic control unit 12 within housing 28. Although not shown in FIG. 2, pneumatic control unit 12 can also include a power supply such as a battery and/or power chord connectable to an electrical outlet and capable of supplying electrical power for the components of pneumatic control unit 12.

Pneumatic control unit 12 includes control circuitry 56. Control circuitry 56 can include processing hardware and machine-readable memory, as well as any further firmware, software, and/or other logic instructions installed thereon, suitable for carrying out the methods specified hereinafter. Control circuitry 56 can be entirely or partially mounted on one or more boards, and can include one or more microprocessors or other type of logic chip or device. For example, control circuitry 56 can include a processor and memory in communication with the processor, the memory storing program instructions executable by the processor to carry out any of the functions referenced herein. Control circuitry 56 can communicate with interface 26 for outputting and/or receiving user input via the interface 26, and can output controlling signals to any of the electronic components, such as a pneumatic regulator 58. Control circuitry 56 can also receive signals from sensors, including a hydraulic pressure signal from hydraulic pressure transducer 14 transmitted via signal line 16. While control circuitry 56 is shown as a separate component, other components of the pneumatic control unit 12 such as the interface 26 and/or pneumatic regulator 58 can include logic circuitry for managing, to at least some degree, their own function.

Pneumatic regulator 58 includes a valve 64 that opens and closes in a controlled fashion, completely and/or to a greater or lesser degree, to control the flow of air through the pneumatic output 22. More specifically, pneumatic regulator 58 receives a flow of pressurized air from pneumatic input 20, and the valve 64 is opened and closed to change the flow and/or pressure of pressurized air through the pneumatic output 22. Valve 64 is controlled by actuator 66, which can for example be a solenoid, motor, or other driven component (e.g., electrically driven) that can open and close valve 64 under in response to control circuitry 56. Valve 64 can be a needle, threaded interface opening, or other type of valve that can open and close a pneumatic pathway. Actuator 66 is controlled by logic circuit 68. Like control circuitry 56, logic circuit 68 can include hardware and program instructions or other type of executable logic. Logic circuit 68 can be a microprocessor, for example. Logic circuit 68 receives a control signal from control circuitry 56 and controls actuator 66 to open or close valve 64 based on the control signal from control circuitry 56. In some embodiments, control circuitry 56 outputs a control signal that ranges between 4-20 milliamps, with the amplitude (i.e. amperage) of the control signal calculated by the control circuitry 52 to proportionally indicate the desired pneumatic output level, such as air pressure ranging from 0 to 100 psi. The milliamp range of the control signal can be proportional to the output air pressure range, mapping the signal range (e.g., 4-20 milliamps) to a pneumatic output range (e.g., 0-100 psi), such that an increase in the milliamp control signal has a proportional increase in output pressure. Although the control signal is described herein as an amplitude-based current signal, the control signal can equivalently be voltage-based. Moreover, although this description characterizes the control system primarily as an analog signal, the system as a whole can be adapted to alternatively use digital control signals.

Logic circuit 68 can receive this control signal from control circuitry 56 and convert the milliamp level of the control signal into a power signal for actuator 66, such as by powering actuator 66 to open and/or close the valve 64 in a binary fashion, or by adjusting the position of the valve 64 in a continuous fashion by an amount corresponding with the level of the amperage of the control signal.

Logic circuit 68 receives a feedback signal from pneumatic pressure transducer 60. Pneumatic pressure transducer 60 can, for example, be a strain gauge capable of producing a pressure reading representing a pneumatic pressure output from the pneumatic regulator 58. Pneumatic pressure transducer 60 measures the pressure within pneumatic output 24 (or otherwise within the hydraulic test circuit 42) and outputs a signal indicative of the pressure within pneumatic output 22 (and thereby hydraulic test circuit 42). If the pressure of the air in the pneumatic output 22 is measured to be below the pressure level corresponding to a level indicated by the control signal from control circuitry 56, logic circuit 68 causes actuator 66 to open valve 64 (e.g., open to a greater degree if already open) or otherwise increase the pressure of the output pressurized air. If the pressure of the air in the pneumatic output 22 is measured to be above the pressure level corresponding to the level indicated by the control signal from control circuitry 56, logic circuit 68 causes actuator 66 to close valve 64 (e.g., open to a lesser degree if continuous airflow is needed) instead, to bleed air to atmosphere, or to otherwise lower the pressure of the pressurized air output to the pneumatic output 22. As such, the pressure regulator 58 operates in a closed loop manner by receiving a control signal from control circuitry 56 indicating a pressure level, logic circuit 68 outputs a signal to the actuator 66 based on the control signal to modulate the airflow and/or pressure with valve 64, and then adjust the signal to actuator 66 based on feedback received from pneumatic pressure transducer 66 indicating whether or not the pressure of the output air is above or below the level indicated by the control signal from the control circuitry 56. Although valve 64 is described herein primarily as modulating outlet pneumatic pressure, valve 64 can alternatively or additionally, and largely equivalently, be controlled via logic circuit 68 of pneumatic regulator 58 to modulate volumetric air flow rate from pneumatic input 22 to pneumatic output 24.

Pump 30 receives a flow of pressurized air from pneumatic output 22. In the illustrated embodiment, pump 30 operates entirely pneumatically from the flow of pressurized air from the pneumatic output 22. In this way, the pneumatic control unit 12 controls the operation of pump 30 by changing the pressure and/or flow of pressurized air delivered to pump 30. In this embodiment, pump 30 does not include any electrical components and is neither electrically nor hydraulically driven, except indirectly via pneumatic control unit 12.

Figure 3:
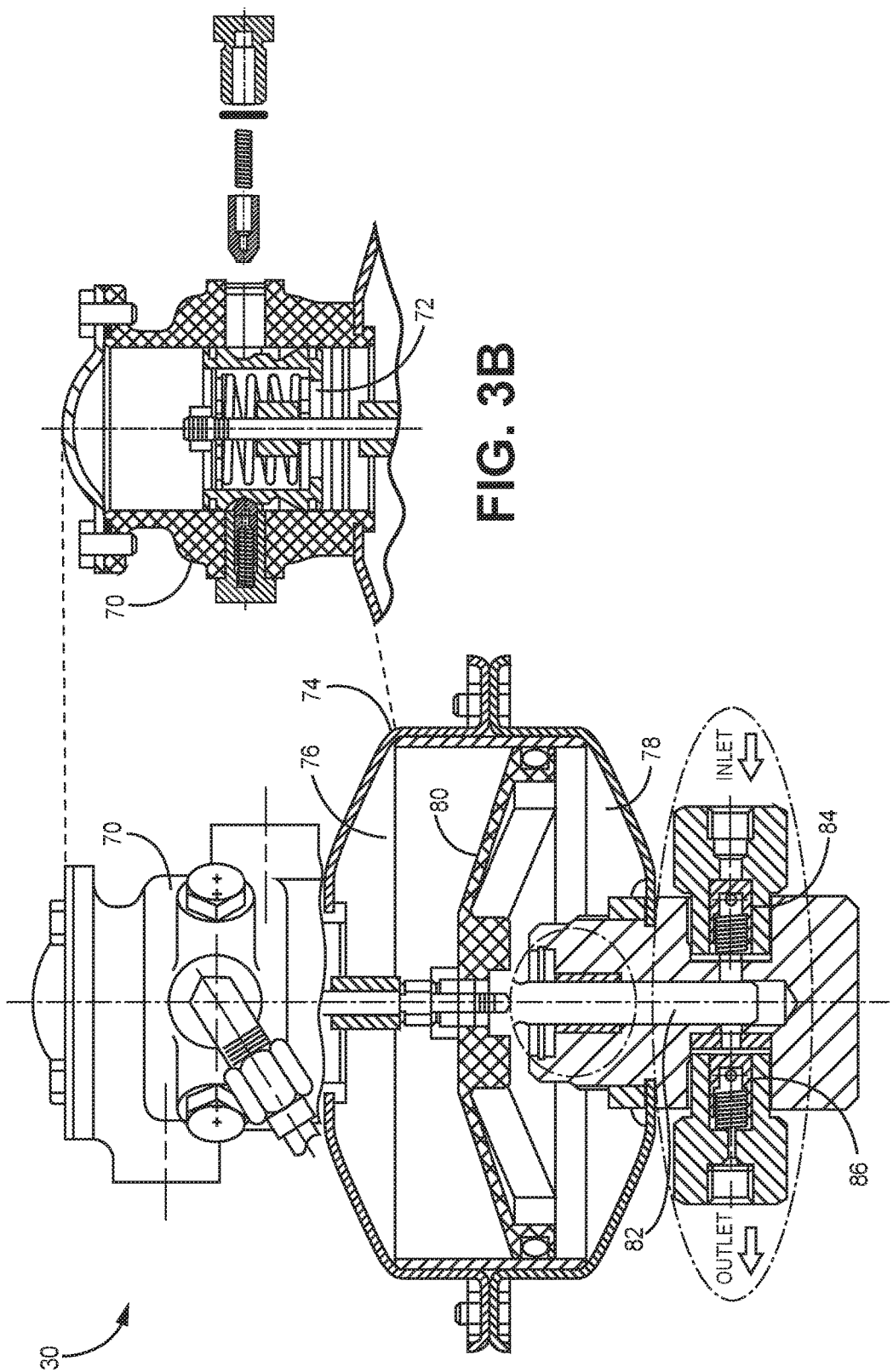
FIG. 3 is a partial sectional view of a pump of the pressure test system of FIG. 1.

FIGS. 3A and 3B provide sectional views of pump 30. FIG. 3A provides a partial sectional view of pump 30 as a whole, while FIG. 3B provides a sectional view of a control valve 70 of the pump 30. Although the following description characterizes elements of pump 30 as "upper" or "lower," the orientation of pump 30 can be varied without departing from the spirit of the present disclosure, and these terms are used only for convenience of description.

Pump 30 receives pressured air from pneumatic actuator 12 through valve 70, which alternatingly routes the incoming pneumatic pressure from pneumatic output 22 to one of two pneumatic chambers. These chambers, referred to hereinafter as upper chamber 76 and lower chamber 78, are located in housing 74. The chambers are separated by diaphragm 80, which seals the chambers with respect to each other. In the illustrated embodiment, diaphragm 80 can be a circular flexible membrane having a center which moves up and down in response to pressure differences between upper chamber 76 in lower chamber 78, while the periphery of the diaphragm 80 is held in place with respect to the housing 74. More generally, diaphragm 80 can be any sealed wall separating the upper and lower chambers 76, 78 while permitting differential pressure therebetween to drive motion of piston 82.

Piston 82 is attached to the center of the diaphragm 80. In the illustrated embodiment, the alternating relative pressurization of upper and lower chambers 76 and 78 translates of the center of diaphragm 80, causing piston 82 to reciprocate up and down. The reciprocation of piston 82 within pumping chamber alternatingly increases and decreases the volume of the pumping chamber. Inlet check valve 84 permits inflow of hydraulic fluid from the fluid supply line 34 into the pumping chamber 88 during the upstroke of the piston 82, but closes on the down stroke of piston 82 to prevent hydraulic fluid from being forced back through the check valve towards the hydraulic source. Outlet check valve 86 operates similarly but oppositely, allowing fluid to be forced from the pumping chamber 88 when the piston 82 is on the down stroke, but closing to prevent hydraulic fluid from being drawn back through the outlet check valve into pumping chamber 88 while piston 82 is on the upstroke. Together, inlet and outlet check valves 86 and 88 prevent retrograde flow through pump 30, ensuring that the reciprocation piston 82 drives fluid from the inlet towards the outlet.

Valve 70 includes shuttle 72, a reciprocating pneumatic router linked to the center the diaphragm 80 and the piston 82 to reciprocate up and down the pumping cycle. Shuttle 72 moves over ports to route and redirect pressurized air flow alternately to the upper chamber 76 and lower chamber 78 based on the piston cycle. For example, when piston 82 reaches the bottom of its down stroke, pressure from the pressurized air in the upper chamber 76 is relieved and pressurized air is routed to the lower chamber 78 to push the center of the diaphragm 80 upward in the upstroke. Afterwards, when piston 82 nears the top of the upstroke, shuttle 72 relieves pressure from the lower chamber 78 and routes the pressurized air the upper chamber 76 to change the direction of movement once again of the center of diaphragm 80. This cycle is repeated so that pump 30 pumps hydraulic fluid through pumping chamber 88 as driven by pneumatic power supplied by pneumatic control unit 12.

Pump 30 is an intensifier pump that outputs hydraulic fluid at a greater pressure than the input pressurized air. This results from the diaphragm 80 having a larger surface area on which the pressurized air can push downward than the surface area of piston 82 that does work on the hydraulic fluid. For example, if the pump 30 has a 100:1 ratio, then an input of pressurized air at 1 PSI yields an output of hydraulic fluid at 100 psi, and an input of pressurized air at 10 PSI yields and output of hydraulic fluid at 1000 PSI.

Pump 30 can intentionally stall when the pressure in the fluid output line 36 balances with the pressure of the pneumatic air acting on the diaphragm 80, compensated by the intensification ratio of the pump 30 (e.g., 100:1). The positions of the middle of diaphragm 80 and piston 82 remain stalled as long as these pressures remain balanced. The pressure in upper chamber 76 will overcome hydraulic fluid pressure if the hydraulic fluid pressure drops, such as in the event of a leak or other pressure loss condition of the test hydraulic circuit 42, in which case piston 82 will resume pumping hydraulic fluid to compensate for the loss of hydraulic fluid and drive the pressure back towards the target stable pressure ratio.

Figure 4:
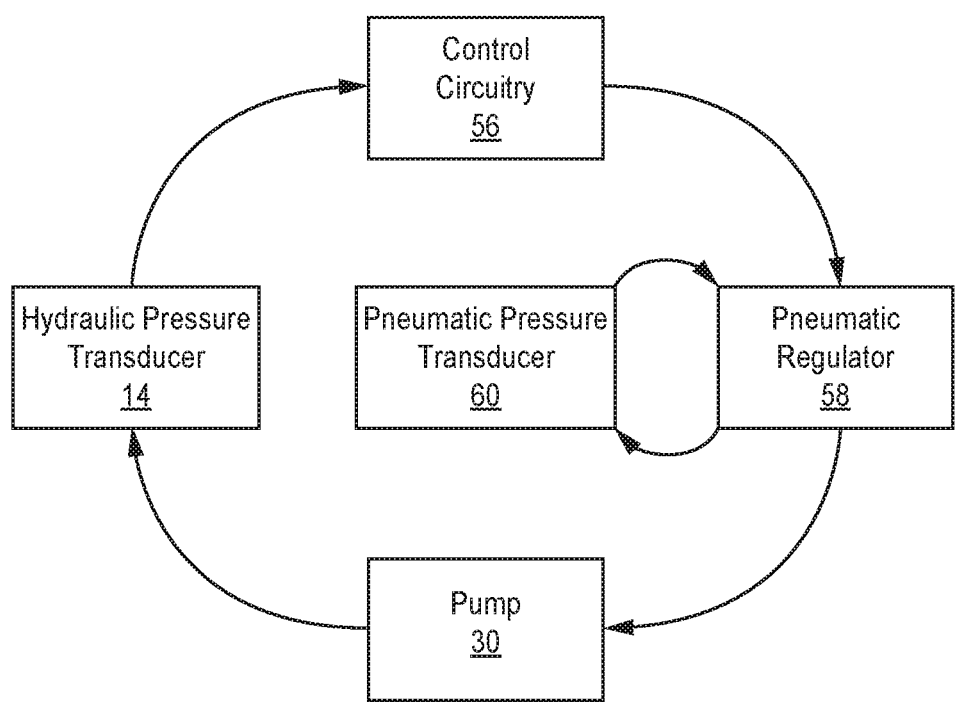
FIG. 4 is a schematic illustration demonstrating a closed-loop method of operation for the pressure test system of FIG. 1.

FIG. 4 is a relational schematic demonstrating a closed-loop operation of pressure test system 10. This closed-loop operation includes two interlinked feedback loops. In the primary (outer; see FIG. 4) loop, control circuitry 56 outputs a control signal to pneumatic regulator 58, which in response outputs air pressurized to a level (e.g. a particular pressure) based on the control signal from the control circuitry 56. Pump 30 operates to pump hydraulic fluid according to the pressure of the pressurized air received from the pneumatic regulator 58. The pressure of the hydraulic fluid output by the pump 30 is measured by hydraulic pressure transducer 14, and control circuitry 56 receives a data signal indicating this sensed pressure (e.g. 4990 psi) of the hydraulic fluid. Control circuitry 56 then compares the level of the signal against a test pressure level, and adjusts the control signal to the pneumatic regulator 58 accordingly (e.g., higher air pressure for higher hydraulic pressure, and lower air pressure for lower hydraulic pressure). Within this loop, the pneumatic regulator 58 includes a sub loop in which pneumatic pressure transducer 60 measures the output of the pneumatic regulator to assess whether the pressure of the air output by the pneumatic regulator 58 is above or below the level targeted as based on the control signal received from the control circuitry 56, and adjust the output of the pneumatic regulator 58 if the measured air pressure is above or below the level targeted as based on the control signal received from the control circuitry 56. For example, the control signal from the control circuitry may indicate that the pneumatic regulator 58 should output 50 PSI (e.g. for hydraulic pressure of 5000 with a pump ratio of 100:1), but if the feedback signal from pneumatic pressure transducer 60 to pneumatic pressure transducer 60 indicates that the air pressure output by pneumatic pressure transducer 60 is actually only 45 PSI, then logic circuit 68 instructs actuator 66 to further open valve 64 or otherwise increase the output pressure by 5 PSI. Like the outer control loop, this inner sub-loop is closed, iteratively or continuously driving the pneumatic pressure sensed by pneumatic pressure transducer 60 towards its target value.

In at least some embodiments, control circuitry 56 does not receive the pneumatic pressure signal from pneumatic pressure transducer 60, nor does the pneumatic regulator 58 receive a signal from the hydraulic pressure transducer 14. These signals remain separate. Even though control circuitry 56 outputs a signal that is controls of pneumatic pressure, the only measurement signal that the control circuitry 56 receives as feedback is the hydraulic pressure signal output by hydraulic pressure transducer 14. In such embodiments, control circuitry 56 and pneumatic regulator 58 do not depend upon or receive data reflecting the state of operation of pump 30, such as cycle rate or the position of piston 82. There is no direct feedback from the pump 30 or the pneumatic regulator 58 to the control circuitry 56. In this way, all feedback is indirect through pump 30, the hydraulic fluid, and the hydraulic pressure transducer 14. In alternative embodiments, however, some or all of these data can be aggregated for the control of pump 30.

Figure 5:
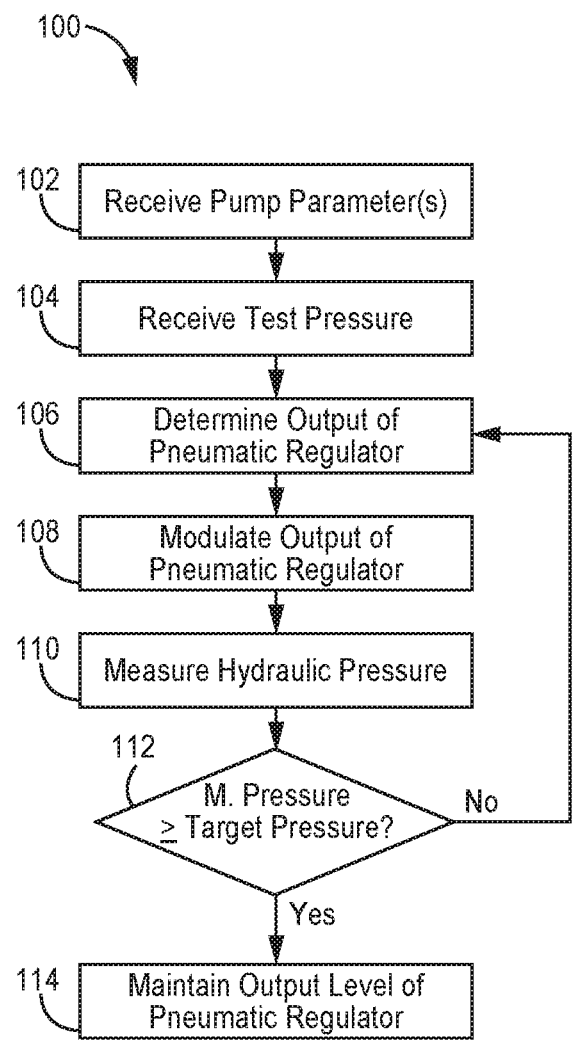
FIG. 5 is a flowchart of a method of operation of the pressure test system of FIG. 1 for evaluating test piece integrity when holding pressure.

FIG. 5 is a flowchart illustrating method 100, a testing method for charging test vessel 50 with hydraulic fluid to evaluate its integrity when holding pressure. In the illustrated embodiment, method 100 begins with receiving pump parameters (step 102), e.g. by the user inputting one or more parameters of the pump 30 into interface 26, and interface 26 relaying that information to control circuitry 56. Control circuitry 56 can, for example look up the pump parameter in a table to obtain information for determining a parameter of a control signal for the pneumatic regulator 58 and/or save the information in memory. Pump parameters can include a pressure rating of the pump 30. For example, each parameter can include the pneumatic pressure rating for driving the pump 30 (e.g., the maximum input pressure the pump is rated to manage for driving the pump 30). The pump parameter can additionally or alternatively include the hydraulic pressure rating for output of the pump 30 (e.g., the maximum pressure of hydraulic fluid the pump is rated to output). These pressure ratings can be a ratio, for example the hydraulic output compared to the pneumatic input, which from the previous example could be 100:1. This ratio can be input directly, or control circuitry 56 can calculate the pump ratio based on provision of the pneumatic and hydraulic pump ratings. From these parameters, the control circuitry 56 can determine which pneumatic input will result in a desired hydraulic output of pump 30, and control the pressure pneumatic regulator 58 accordingly.

In some embodiments, interface 26 can allow a user to select a model of pump 30. Information for various types of models of pumps 30 (e.g. including pressure rating) can be stored in memory of the control circuitry 56. Operational parameters associated with those various types of models of pumps 30 can also be stored in memory and can be called up and used when a corresponding pump is selected (input) by user via the interface 26. In this way, the pump parameters may be retrieved in step 102 by the user selecting or otherwise inputting the type of pump being used and the particular pump parameters (e.g., pressure rating) being referenced from memory storage on board pneumatic control unit 12 based on the pump selection.

Pressure test system receives test pressure via interface 26 (step 104). This test pressure can be received via the interface 26. The test pressure can, for example, be a hydraulic pressure at which the user desires to test the test vessel 50. For example, a user can input 10,000 PSI, and method 100 will build hydraulic pressure to 10,000 PSI in test vessel 50 as indicated by the hydraulic pressure transducer 14. This input test pressure can be received by the control circuitry 56 and stored in memory. Although test pressure is described here as referring to a singular pressure, step 104 can more generally receive any schedule or order of pressures for testing, e.g. for validation of the test vessel at multiple pressures. Although steps 102 and 104 are illustrated as sequential in FIG. 5, this order is arbitrary, and steps 102, 104 need not be related. More generally, steps 102 and 104 must both occur before step 106.

In step 106, method 100 progresses to determining the output of pneumatic regulator 58. Step 106 can be performed by control circuitry 56 based on the information received from steps 102 and 104. Determining the output of pneumatic regulator 58 can include control circuitry 56 calculating what pneumatic pressure, as output by the pneumatic regulator 58, will operate the pump 30 to output hydraulic pressure up to the test pressure. Continuing with the previous example, if 10,000 PSI is the test pressure and the pump has a ratio of 100:1, control circuitry 56 can calculate that an output of 100 psi by pneumatic regulator 58 will cause the pump 30 to build hydraulic pressure up to 10,000 psi. Control circuitry 56 can then send a control signal to the pneumatic regulator 58 indicating the pressure at which pneumatic regulator 56 is to output pressurized air, and pneumatic regulator 58 can receive control signal to perform step 108. In step 108, pneumatic regulator 58 receives the control signal and modulates its output of pressurized air to match the output pneumatic pressure level indicated by the control signal, which operates the pump 30 to pump hydraulic fluid and build hydraulic pressure in the test vessel 50.

The resulting hydraulic pressure applied to test vessel 50 is measured in step 110. This hydraulic pressure can be measured by the hydraulic pressure transducer 14, which indicates the progress of the pump 30 in building hydraulic pressure to the test pressure. The hydraulic pressure signal can be output to control circuitry 56, which can compare the measured hydraulic pressure to the test pressure to determine in step 112 whether the measured pressure is greater than or equal to the test pressure. If the measured pressure is below (i.e. has not yet reached) the target pressure, method 100 can loop back to step 106 to determine the output of the pneumatic regulator 56. In some loop iterations, the step of determining the output of the pneumatic regulator will determine that the control signal to the pneumatic regulator 58 already indicates the appropriate level for the desired pneumatic pressure output by the pneumatic regulator 58 (e.g., if the hydraulic pressure is increasing over multiple loops) in which case the control signal may be maintained at the same level, and the method 100 can go through another loop to determine, again, in step 112 whether the measured pressure is at or greater than the test pressure.

In a first iteration of step 106, in which the output of the pneumatic regulator 58 is determined, the control signal may not have an air pressure output parameter set at the air pressure calculated to be needed to achieve the target hydraulic pressure. Rather, the air pressure output parameter of the control signal may be set lower than the air pressure calculated to be needed to achieve target hydraulic pressure. The control circuitry 56 may lower the pressure output of the pneumatic regulator 58 via the control signal below the pressure required to achieve the test pressure for the first and possibly multi iterations of the loop of steps 106-112. For example, in the first iteration and possible several more iterations, the air pressure may be set at 75% of the air pressure calculated to be needed to achieve the target hydraulic pressure. Outputting 75% of the air pressure calculated to be needed to achieve a test hydraulic pressure may continue until the measured hydraulic pressure is ½ (or other fraction) of the test hydraulic pressure. After ½ (or another fraction) of the test hydraulic pressure is achieved, then the output of pneumatic regulator 58 in step 106 can be set to the particular pneumatic pressure output by pneumatic regulator 58 determined to achieve the test hydraulic pressure. Alternatively, after ½ (or another fraction) of hydraulic pressure is achieved, step 106 of determining the output of the pneumatic regulator 58 can comprise incrementing the output of the pneumatic regulator 58 a particular amount (e.g., 1 PSI) or a percentage of its output range (e.g., 1%) each, checking whether the measured pressure is greater than or equal to the test pressure in step 112, and then looping back to determining step 106 if the measured pressure is still less than the test pressure to again increment or otherwise increase the output of the pneumatic regulator 58, and continue the incrementing/increasing and looping until the measured pressure is greater than or equal to the test pressure to pass step 112. More generally, a first iteration of stem 106 can utilize any appropriate reduced power setting, which is only iteratively adjusted upwards in successive repetitions of step 106 towards the pneumatic pressure calculated to be necessary to produce the targeted hydraulic pressure for test vessel 50.

The purpose of initially not running the pump 30 at 100% of the power calculated to be needed to achieve the test hydraulic pressure is so that significant hydraulic fluid is not lost and/or the pressure of leaking hydraulic fluid is minimized (which could be a safety hazard if leaking at very high pressure). If there is a leak anywhere in the system, particularly in vessel 50, then the hydraulic pressure is unlikely to reach ½ (or other appropriate fraction) of the test hydraulic pressure, and thus pump 30 will never be operated at 100% of the power calculated to be needed to achieve the test pressure. This gives an opportunity for the operator to stop the test before full power is applied. Absent fault conditions, the gradual increase of pumping power towards the target pressure occurs without need for intervention or supervision by the operator.

If control circuitry 56 is already causing the pneumatic regulator 58 to output pressurized air at the pressure level calculated to achieve a test hydraulic pressure, but the measured pressure is still less than the target hydraulic pressure as determined in step 112, then the next and/or subsequent iterations of step 106 can set the output of the pneumatic regulator 58 at greater than the pressure level calculated to achieve a test hydraulic pressure. For example, as previously mentioned, some embodiments may include incrementing the pneumatic pressure output by the pneumatic regulator 58 with one or more iterations of step 106. In some such embodiments incrementation can further increase the pneumatic pressure output until the pneumatic pressure operates the pump 30 with sufficient power to achieve the test hydraulic pressure, even if the resultant pneumatic pressure output is greater than what was calculated to be necessary to achieve the test hydraulic pressure.

If the measured hydraulic pressure is greater than or equal to the test pressure in step 112, then method 100 advances to step 114, wherein the output level of pneumatic regulator 58 is maintained (e.g., at the pneumatic pressure determined in the most recent iteration of step 106). Method 100 uses small incremental pressure increases in iterative step 106 so as to not significantly overshoot the test hydraulic pressure. At or close to when the test hydraulic pressure is achieved, consequently, the pneumatic pressure acting on the diaphragm 80 of pump 30 will balance with the pressure of the hydraulic fluid in pump chamber 88 and the pump 30 will stall, thus maintaining the hydraulic pressure in test vessel 50 at or near the test hydraulic pressure. Incrementing the output of pneumatic regulator 58 in step 106 by small amounts (e.g., one tenth or one half PSI), as previously described, can prevent large overshoot of the target hydraulic pressure because the incremental stair stepping of the pneumatic pressure and repeated pressure testing of the hydraulic fluid such that the hydraulic pressure should not be more than one increment, proportional to the intensification factor of the pump 30.

The control signal output by control circuitry 56 to pneumatic regulator 58, in various embodiments, is effectively seeking out the pneumatic output pressure at which the pump 30 balances at precisely (or nearly precisely) the test pressure of the hydraulic fluid set by the user (step 104), as indicated by hydraulic pressure transducer 14. As such, control circuitry 56 may start with a single level instructing pneumatic regulator 58 to start below a level of pneumatic pressure calculated to be necessary to produce the test pressure of the hydraulic fluid, and progressively increment or otherwise increase the output of the pneumatic regulator 58 over successive iterations of the method loop to approach the pneumatic pressure actually required (even if not what was originally calculated) to yield the test hydraulic pressure. In this way, although the calculated required pressure is used to inform the starting point the pneumatic regulator output, method 100 is not limited by inaccuracies that might affect this predicted required pressure. In this way method 100 allows control circuitry 56 to iteratively or incrementally seek out the pneumatic output pressure that stalls the pump 30 at the target or test hydraulic pressure by.

Method 100 can be useful for any application requiring the continuous maintenance of vessel 50 at a precisely specified pressure. This is particularly relevant in the application of burst testing, as a test hydraulic pressure is achieved and maintained to test the burst integrity of test vessel 50 for as long as the user desires. Moreover, even if there is some slight leakage (which may be intended or acceptable in some systems, e.g. some valves), the resulting pressure imbalance will take pump 30 out of the stall condition and naturally cause pressure test system 10 to resume pumping to recover and maintain hydraulic pressure at or near the target hydraulic pressure to continue the burst test despite the leak.

Figure 6:
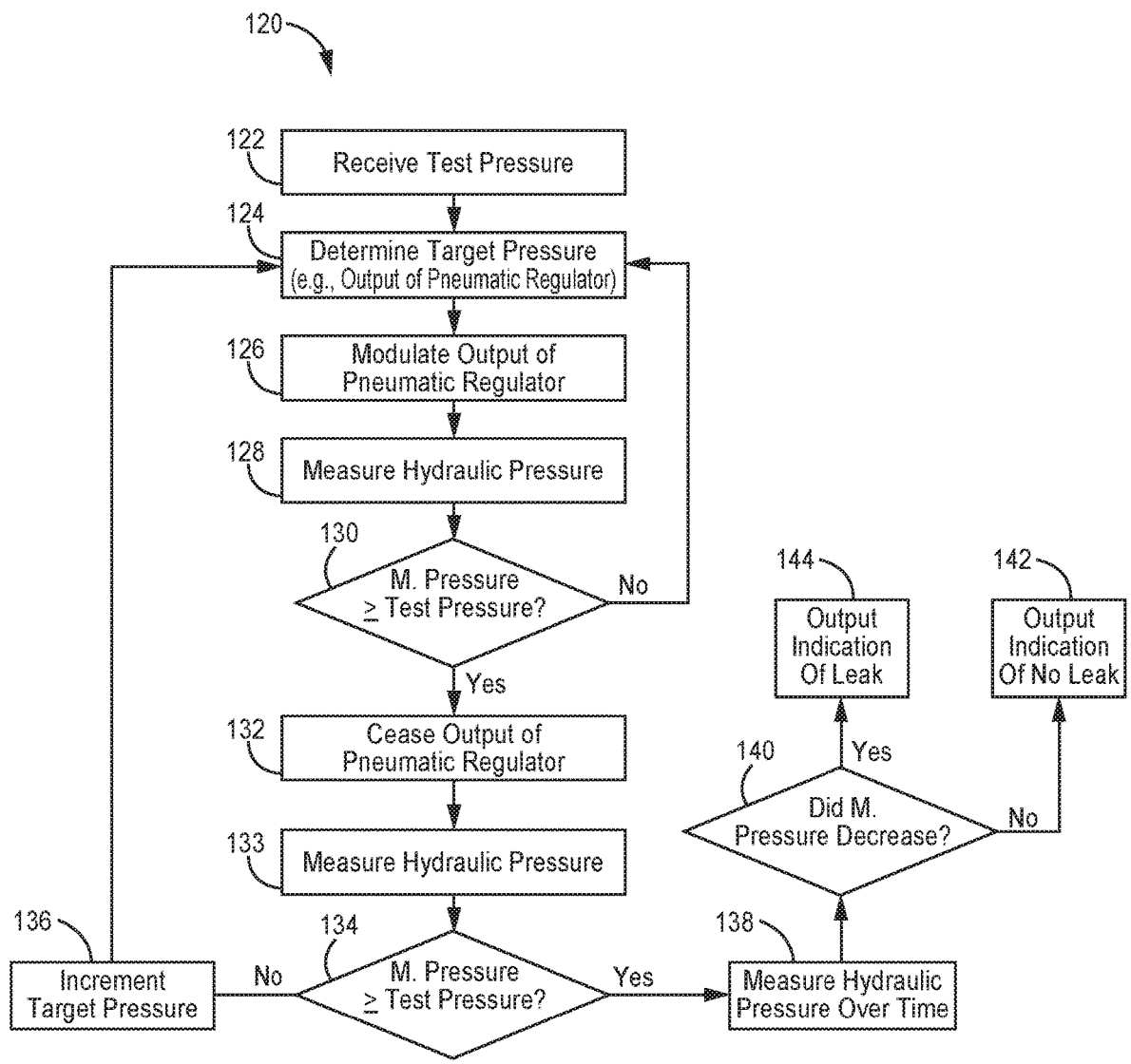
FIG. 6 is a flowchart of a method of operation of the pressure test system of FIG. 1 for conducting a leak test.

FIG. 6 is a flowchart of a method 120 for conducting a leak test. As contrasted to method 100, which is suitable to burst tests, method 120 is extremely sensitive to any pressure drop, whether it be from a leak in test vessel 50, a leak somewhere else in hydraulic circuit 42, or an issue with a check valve. In method 120, pump 30 is used to build pressure to a test hydraulic pressure generally as described above with respect to method 100, but pump 30 is then disengaged from the hydraulic circuit 42 by ceasing output of more pressurized air to the pump 30 when the hydraulic circuit 42 is tested for a leak so that the high sensitivity leak test does not mistake a fluctuation from the pump 30 (e.g., as a result of any fluctuation upstream from the pump 30 in either the hydraulic or pneumatic paths) for a leak in the test vessel 50. During the leak testing, the outlet check valve 86 (and/or other check valve) fluidly isolates hydraulic circuit 42 from pump 30, such that hydraulic circuit 42 is ideally a static system with no moving parts from the test system, and such that any pressure drop is consequently attributable only to behavior of (e.g. leaks in) test vessel 50. In practice, however, disengaging pump 30 may not eliminate all non-leak sources of pressure drop. In some cases, the stress caused by hydraulic pressure elsewhere within hydraulic circuit can cause components in hydraulic circuit 42 to expand and relax, thereby enlarging the total volume of hydraulic circuit 42, resulting in a slight pressure drop which could be inadvertently misidentified as a leak. In another scenario, outlet check valve 86 may allow a very small amount of retrograde flow before completely closing, thus allowing a pressure decrease from the peak pressure at the last moment piston 82 moved, which can make it hard to achieve a test hydraulic pressure level and/or assure that the hydraulic pressure is over the desired test pressure without needing a dramatic overshoot. These and various other issues can be addressed through method 120.

Method 120 includes receiving test pressure 122, analogously to step 104 of method 100. This test pressure is the hydraulic pressure developed in the test vessel 50 at which the leak test is to be conducted. Methods 100 and 120 can, in some embodiments, be combined (i.e. both employed) over the course of a single testing session, which case steps 122 and 104 can involve the same pressure level or different pressure levels. Step 102 can be performed in connection with method 120 so that control circuitry 56 can use the pump parameters to calculate pneumatic pressure output, as described previously with regard to FIG. 5. In various embodiments, method 100 can be performed before the method 120 (e.g., when one continuous test performs a burst test and a subsequent leak test on the same test vessel 50) such that the pump parameters do not change and thus step 102, and potentially steps 104-112, do not need to be repeated. However, in the event that the method 100 is not performed in its entirety, step 102 can be performed separately from method 100 in combination with method 120.

Continuing with the method 120, output of pneumatic regulator 58 is determined in step 124. Step 124 can be similar to step 106, including the options discussed herein. For example, the output of pneumatic regulator 58 can initially be set at a fraction of the pneumatic pressure calculated to be needed to operate the pump 30 to achieve the test pressure, with later iterations of step 126 driving the output pressure of the pneumatic regulator 58 towards the pneumatic pressure calculated to be needed to operate the pump 30 to achieve the target hydraulic pressure, or until the test pressure is reached.

Method 120 further includes step 128, in which the hydraulic pressure is measured. The hydraulic pressure can be measured in any was discussed herein, for example in the same manner as step 110 by hydraulic pressure transducer 14. The signal can be relayed to the control circuitry 56 as previously described. Step 130 can include control circuitry 56 comparing the measured hydraulic pressure to the test hydraulic pressure to determine whether the measured hydraulic pressure is greater than or equal to test hydraulic pressure. If the measured hydraulic pressure is less than the test hydraulic pressure, then the method 120 loops back to step 124 in which the output of the pneumatic regulator 58 is determined, which as previously described can include maintaining the pressure level output by the pneumatic regulator 58, or incrementing or otherwise increasing the pressure level output by the pneumatic regulator 58. This loop of steps can be repeated until the measured hydraulic pressure is greater than or equal to the test hydraulic pressure as determined by step 130. If the condition of step 130 is met, then the method 120 advances to step 132. Steps 124-130 can, as noted, be conducted similarly to steps 104-112.

In step 132, pneumatic regulator 58 ceases output of pressurized air, such as by logic circuit 68 causing actuator 66 to completely close valve 64. In some cases, pneumatic regulator 58 can also empty the pressure within the pneumatic output 22. This cessation of pressure from pneumatic regulator 58 relieves pneumatic pressure in upper chamber 76 of pump 30, dropping pressure in pump chamber 88 and causing the higher pressure hydraulic fluid in hydraulic circuit 42 to close the outlet check valve 86 of the pump 30. In this state, no external hydraulic pressure is applied to the hydraulic circuit 42, which is ideal for a leak test because any leak will not be compensated for (and hidden by) further pumping of hydraulic fluid. In some embodiments, an alternative to step 132 is to close a valve between the pneumatic regulator 58 and the pump 30, or in some other manner relieve the pneumatic pressure on pump 30 so that outlet check valve 86 closes for the remaining duration of the leak test. More generally, step 132 fluidly isolates pump 30 from hydraulic circuit 42.

After fluidly separating pump 30 from hydraulic circuit 42 in step 132, an updated measure of hydraulic pressure on test vessel 50 is taken in step 134. Hydraulic pressure can be sensed in any way described herein, e.g. equivalently to steps 128 or 110 using hydraulic pressure transducer 14. In step 134, method 120 then compares the newly measured hydraulic pressure to the test hydraulic pressure to determine whether the measured hydraulic pressure is greater than or equal to the test hydraulic pressure. Even though this check can be substantially identical to the check performed in step 130, hydraulic pressure within hydraulic circuit 42 can drop after step 132 due to an inherent pressure loss from closing outlet check valve 86, from relaxation of components in hydraulic circuit 42, through inefficiency in pump 30, or from other factors. Pressure losses of these kinds can cause pressure that registered as above the target pressure at step 130 to fall below that target pressure at step 134, particularly if the hydraulic pressure measured at step 130 was just at or barely beyond the test hydraulic pressure. Step 134 thus verifies that the sensed pressure at pressure vessel 50 remains at or above the target pressure with a second check, in case ceasing the output of the pneumatic regulator 58 and step 132 (or otherwise disengaging the pump 30) caused a slight pressure drop below the test hydraulic pressure.

If the measured hydraulic pressure did indeed drop below the test hydraulic pressure between steps 130 and 134, then method 120 advances to step 136 in which the target pneumatic pressure output for pneumatic regulator 58 (as instructed by control circuitry 56 via the control signal) is incrementally increased. The increment of this increase can be a predetermined amount, such as 0.1 PSI, 1 PSI, 5 PSI, 7 PSI, 10 PSI, or a percentage of the range of pressure output (e.g., 0.5% of pressure output range of the pneumatic regulator 58) or any other amount of the pressure output by the pneumatic regulator 58, for example based on the difference between the target pressure and the pressure sensed at step 134. Method 120 then returns to step 124 to start the process of building the measured hydraulic pressure up to or above the target hydraulic pressure to see whether, at the incremented target pneumatic pressure, the measured hydraulic pressure can be maintained at or above the test hydraulic pressure in step 134 despite the cessation of output of the pneumatic regulator 56 and step 132. It is expected that after sufficient iterations this loop adjusting the target pneumatic pressure, method 120 will achieve the test hydraulic pressure at step 134 despite the drop in measured hydraulic pressure between steps 130 and 134.

In some embodiments of step 136, after a first or subsequent iteration of step 132, if the measured hydraulic pressure is less than the test pressure, control circuitry 56 can calculate the amount of pressure drop that has occurred after the cessation of pneumatic output to pump 30. Based on that magnitude of this pressure drop, control circuitry 56 can calculate how much to proportionally increase the pneumatic pressure in the next iteration to account for that level of hydraulic pressure drop so that at the next iteration the hydraulic pressure drop stops at the test pressure. For example, if after step 132 the measured hydraulic pressure dropped 3 PSI between steps 130 and 134, then the step 136 can increase the pneumatic output of the pressure regulator 58 by an amount proportional to 3 PSI of the hydraulic pressure (calculating the intensification ratio of the pump 30).

If step 134 returns that the measured hydraulic pressure matches or exceeds the test pressure, then method 120 advances to step 138. In step 138, control circuitry 56 measures the hydraulic pressure from hydraulic pressure transducer 14 for a predetermined amount of time (e.g., ten second, 30 seconds, or any other time frame appropriate to the nature of the test) to determine whether the measured hydraulic pressure decreased over this sampling period. In step 140, the system determines whether the measured hydraulic pressure decreased during this time. During steps 138 and 140, the output of the pneumatic regulator 58 is stopped so as to not operate pump 30, or pump 30 is otherwise disengaged from hydraulic circuit 42. If the measured hydraulic pressure did decrease during the predetermined amount of time, i.e. if pressure at test vessel 50 fell while hydraulic circuit 42 was closed, then a leak condition is confirmed and the method 120 will advance to step 144 to output an indication of that a leak has been detected. This leak indication can be output by control circuitry 56 with a signal to interface 26 to flag the leak. Interface 26 can then output a "leak" indication, which in some cases can be indicated by text, alarm, a graph plotting a decrease in pressure, or other visual and/or audio indication of a leak. Conversely, if the measured hydraulic pressure did not decrease during the preset time period as determined by step 140, then method 120 can advance to step 142 to output a "no leak" indication, which can similarly occur by control circuitry 56 instructing interface 26 to output text, alarm, a graph plotting a decrease in pressure, or other visual and/or audio indication that no leak was detected.

Figure 7:
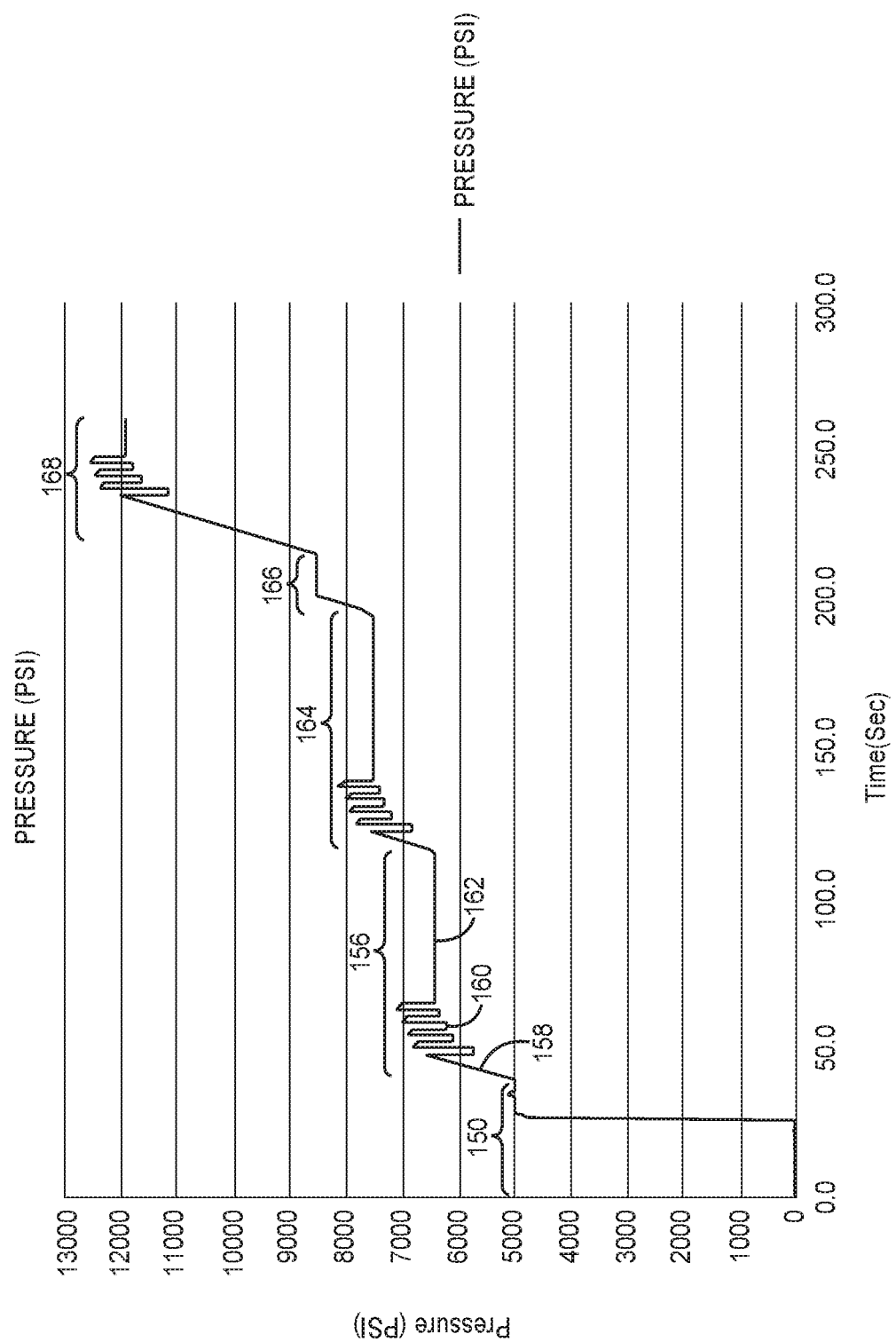
FIG. 7 is a plot of pressure with respect to time illustrating the operation of the methods of FIGS. 5 and 6.

FIG. 7 shows a plot of sensed hydraulic pressure over time in an example of an illustrative series of tests according to methods 100 and 120. As illustrated in FIG. 7, a series of pressure tests can be carried out in succession without restarting each respective instance of methods 100 or 120 from its beginning. Methods 100 and 120 can in some embodiments be partially combined or integrated to perform a combination of one or more burst tests and one or more leak tests. FIG. 7 illustrates an exemplary case of one such partial combination, as these methods are alternated and one is used to build pressure for the other for successive test pressures. FIG. 7 represents only one example of operation of methods 100 and 120, and should not be understood as limiting with regard to its particulars.

The exemplary pressure plot of FIG. 7 can for example be an illustrative signal output by hydraulic pressure transducer 14. The plot is divided into various phases. The first phase (150) demonstrates the burst test of method 100. At time 0, control circuitry 56 determines an output of pneumatic regulator 58 by reference to the test pressure (which is 5000 psi in the first phase 150) and the pump parameter(s) received. Pneumatic regulator 58 modulates the output pneumatic pressure supplied to the pump 30 based on the control signal from the control circuitry 56, operating the pump to pump hydraulic fluid and build pressure in hydraulic circuit 42. In this example, it takes about 25 seconds for hydraulic circuit 42 (including the test vessel 50) to fill with hydraulic fluid such that hydraulic pressure begins to build. During the first 25 seconds, it is possible that the algorithm would loop through the method 100 multiple times, e.g. once every tenth of a second. Once the 5000 psi test pressure is reached, pump 30 stalls, balanced between the pneumatic input pressure and the hydraulic output pressure. As shown in FIG. 7, small fluctuations in pressure can occur as the system relaxes, temporarily unbalancing pump 30 and causing piston 82 to advance until the stall condition once again occurs and stabilizes.

Second phase 156 demonstrates an instance of method 120. In this case, the received test pressure can be 7500 psi. The pressure builds linearly, as shown by signal feature 158, as the method 120 iterates through steps 124, 126, 128, 130, and back to 124. In these iterative loops, pneumatic pressure output by the pneumatic regulator 58 may be successively increased as hydraulic pressure builds. Although pressure is shown increasing linearly, pressure can in other embodiments increase in other fashions, e.g. increasing more rapidly initially before slowing in rate of increase as the sensed hydraulic pressure approaches the target (test) pressure. Signal feature 160 includes a number of spikes and troughs. These spikes and troughs represent method 120 passing step 130 but failing step 134 through successive iterations, as the measured hydraulic pressure is initially greater than the test pressure such that the output of the pneumatic regulator 58 is halted in step 132, but falls below the test pressure after step 132 as described previously. When step 134 determines that the measured hydraulic pressure is less than the test pressure, method 120 returns to step 136 with an incrementally increased target pneumatic pressure. As shown in FIG. 7, the resulting sensed hydraulic pressure prior to step 132 exceeds the target pressure, demonstrating intentional overshoot of the test pressure in order to avoid falling below the test pressure when the pump 30 is disengaged and the pressure consequently drops slightly. Several iterations of incrementing the target pressure, operating the pneumatic regulator 58 to drive the pump 30 to produce the target pressure in the hydraulic fluid, disengaging the pump 30, and then once again having the measured hydraulic pressure fall below the test pressure are shown by the spikes and troughs. Once the target pressure is incremented high enough, however, the pressure drop from the target pressure no longer drops sensed pressure below the test pressure, and the condition of step 134 is satisfied. Hydraulic pressure is then measured over a period of time, as in step 138, which in this example is about 50 seconds. In this example, no leak condition is detected as the hydraulic fluid pressure remains the same throughout the test period as indicated by hydraulic pressure signal feature 162.

The third test phase 164 also demonstrates a leak detection process according to method 120. The fourth phase 166 demonstrates an additional burst test. The firth phase 168 demonstrates a further leak detection test according to the method of 120. As shown herein, the testing regime as a whole consists of a plurality of burst and/or leak tests conducted at increasing pressures.

One advantage of pressure test system 10, and of pneumatic control unit 12 in particular, is that it can work with many types of pumps 30. For example, a user can use different types of pumps for different applications, and these pumps may be configured for different pressures or flow rates. Larger test vessels 50, for example, may require higher flow pumps 30 for efficient testing. As another example, if a pump is already installed at a test facility, then the capabilities of the described control system can be used without uninstallation of the pump. By retaining pump parameter(s) of multiple pumps (see step 102), pneumatic control unit 12 can be easily used with different pumps without need for extensive reconfiguration or different hardware. Furthermore, pneumatic control unit As a further advantage of pressure test system 10, pneumatic control unit 12 provides controlled ramp up of hydraulic pressure towards a test pressure, thereby avoiding wasted hydraulic fluid or catastrophic failure in the event of a fault with either test vessel 50 of the test system itself. Pressure test system 10 is capable of operating according to method 100, method 120, or both. Methods 100 and 120 can be combined across a single testing procedure, thereby validating a test vessel with regard to multiple possible failure conditions. Furthermore, generalized methods of operation for pressure test system 10 allow multiple such tests under methods 100, 120 to be combined without need for operator intervention or iteration—that is, control circuitry 56 can drive pressure test system 10 through a series of tests without need for human intervention, generating a record of test results through the process.

Discussion of Possible Embodiments

The following are non-exclusive descriptions of possible embodiments of the present invention.

A pressure testing system for pressurizing and testing a test vessel using a pump driven by pneumatic pressure and having a pressurized hydraulic fluid outlet to the test vessel, the pressure testing system comprising: a hydraulic pressure transducer coupled to the hydraulic fluid outlet to generate a hydraulic pressure signal indicative of hydraulic pressure at the test vessel; and a pneumatic control unit configured to drive the hydraulic pump via a supply of pressurized air, the pneumatic control unit comprising: a pneumatic regulator disposed to modulate a pneumatic pressure of the pressurized air toward a target pneumatic pressure; and control circuitry configured to receive the hydraulic pressure signal, set the target pneumatic pressure based on a target hydraulic pressure at the test vessel, and iteratively increase the target pneumatic pressure until hydraulic pressure signal exceeds the target hydraulic pressure.

The pressure testing system of the preceding paragraph can optionally include, additionally and/or alternatively, any one or more of the following features, configurations and/or additional components:

A further embodiment of the foregoing pressure testing system, wherein the pneumatic control unit includes a pressurized air inlet from a pneumatic source, and a pressurized air outlet to the pump, and wherein the pneumatic regulator is disposed between the pressurized air inlet and outlet, and modules the pneumatic pressure of the pressurized air by metering airflow from the pressurized air inlet to the pressurized air outlet.

A further embodiment of the foregoing pressure testing system, wherein the pneumatic regulator comprises a pneumatic valve disposed between the pressurized air inlet and the pressurized air outlet, and actuatable to open or close in response to a control signal from the control circuitry.

A further embodiment of the foregoing pressure testing system, wherein the pneumatic control unit includes a pneumatic pressure transducer disposed between the pneumatic valve and the pump to sense a pneumatic pressure of the pressurized air provided by the pneumatic control unit to the pump.

A further embodiment of the foregoing pressure testing system, wherein the pneumatic regulator is configured to iteratively update actuation of the pneumatic valve based on comparison of the sensed pneumatic pressure with the target pneumatic pressure, independently of the target hydraulic pressure or the sensed hydraulic pressure.

A further embodiment of the foregoing pressure testing system, wherein the pump is an intensifier pump, and wherein the control circuitry is further configured to receive pump data reflecting an intensification ratio of the pump.

A further embodiment of the foregoing pressure testing system, wherein setting the target pneumatic pressure based on the target hydraulic pressure comprises determining a pneumatic pressure corresponding to the target hydraulic pressure, based on the intensification ratio.

A further embodiment of the foregoing pressure testing system, further comprising an operator interface disposed to input the pump data to the control circuitry, and to output test results to an operator.

A further embodiment of the foregoing pressure testing system, further comprising a hydraulic valve actuatable to fluidly isolate the pump from a fluid circuit including both the test vessel and the hydraulic pressure transducer.

A further embodiment of the foregoing pressure testing system, wherein the pump is driven entirely by the pressurized air.

A further embodiment of the foregoing pressure testing system, further comprising the pump.

A method of operating a pneumatic testing system including a pump and a pneumatic regulator, the method comprising: specifying a test pressure; determining an output pressure of the pneumatic regulator; modulating pressurized air output from the pneumatic regulator, to the pump, to drive the pump; outputting hydraulic fluid from the pump to a test vessel; sensing a hydraulic pressure output by the pump to the test vessel, via a hydraulic pressure transducer; comparing the sensed hydraulic pressure to the test pressure; and increasing the determined output pressure of the pneumatic regulator until the sensed hydraulic pressure is not less than the test pressure.

The method of the preceding paragraph can optionally include, additionally and/or alternatively, any one or more of the following features, configurations and/or additional components:

A further embodiment of the foregoing method, wherein the pump is an intensifier pump, the method further comprising receiving pump parameters comprising or indicating a pump intensification ratio.

A further embodiment of the foregoing method, wherein determining an output pressure comprises identifying a target pneumatic pressure based on the target hydraulic pressure and the pump intensification ratio, and wherein modulating pressurized air output from the pneumatic regulator comprises driving pneumatic pressure towards the target pneumatic pressure.

A further embodiment of the foregoing method, wherein driving pneumatic pressure towards the target pneumatic pressure comprises iteratively increasing the pneumatic pressure, from less than the target pneumatic pressure.

A further embodiment of the foregoing method, further comprising sensing an output pneumatic pressure from the pneumatic regulator to the pump, and comparing the sensed output pneumatic pressure with the target pneumatic pressure.

A further embodiment of the foregoing method, further comprising maintaining an output level of the pneumatic regulator, once the sensed hydraulic pressure exceeds the target pressure.

A further embodiment of the foregoing method, further comprising fluidly isolating the pump from a hydraulic circuit including the test vessel and the hydraulic pressure transducer, once the sensed hydraulic pressure exceeds the target pressure.

A further embodiment of the foregoing method, further comprising reassessing whether the sensed hydraulic pressure remains no less than the test pressure, after fluidly isolating the hydraulic circuit from the pump, and reengaging the pump at an increased output pressure of the pneumatic regulator in response to the sensed hydraulic pressure falling below the test pressure.

A further embodiment of the foregoing method, further comprising maintaining the isolation of the pump from the hydraulic circuit for a test period; monitoring the sensed hydraulic pressure throughout the test period; and outputting either a "no leak" indication1 if the sensed hydraulic pressure remains the same throughout the test period, or a "leak" indication otherwise.

A control system for operating a pump, the pump being pneumatically driven to pump hydraulic fluid to pressurize a closed vessel, the control system comprising: an inlet port configured to receive inlet pressurized air; an outlet port configured to output outlet pressurized air for powering the pump; a pneumatic regulator disposed between the inlet and outlet ports and configured to receive the inlet pressurized air and output the outlet pressurized air, the pneumatic regulator comprising a valve that modulates a pressure of the inlet pressurized air to generate output of the outlet pressurized air based on a control signal received by the pneumatic regulator; and a pressure transducer configured to output a hydraulic pressure signal indicative of hydraulic pressure measured from the output of the pump; and control circuitry configured to receive the hydraulic pressure signal, adjust a control parameter of the control signal based on hydraulic pressure signal, and output the control signal to the pneumatic regulator to indirectly control operation of the pump.

The control system of the preceding paragraph can optionally include, additionally and/or alternatively, any one or more of the following features, configurations and/or additional components:

A further embodiment of the foregoing control system, further comprising a user interface, the user interface in communication with the control circuitry, the user interface configured to receive input of an indication of a target pressure and output the indication of the target pressure to the control circuitry.

A further embodiment of the foregoing control system, wherein the control circuitry is configured to determine an initial value of the control parameter of the control signal based on the indication of the target pressure, such that the initial value of the control parameter of the control signal is selected to cause the pressure of the outlet pressurized air to build hydraulic pressure output by the pump to the target pressure.

A further embodiment of the foregoing control system, wherein the target pressure is a test pressure level at which the closed vessel is being tested for one or both of burst and leak integrity.

A further embodiment of the foregoing control system, wherein the control circuitry is further configured to receive one or more pump parameters of the pump, and wherein the control circuitry is configured to determine the initial value of the control parameter of the control signal based in part on the one or more pump parameters.

A further embodiment of the foregoing control system, wherein the one or more pump parameters comprise an input pump pressure rating, and output pump pressure rating, or a ratio of the input pump pressure rating to the output pump pressure rating.

A further embodiment of the foregoing control system, wherein the one or more pump parameters comprise an indication of the input-to-output pressure amplification of the pump.

A further embodiment of the foregoing control system, wherein the control parameter is a target pneumatic pressure to which the pneumatic regulator is driven, and wherein the pneumatic pressure is based on the target pressure and the input-to-output pressure amplification of the pump.

A further embodiment of the foregoing control system, wherein adjusting the control parameter based on the hydraulic pressure signal comprises comparing the hydraulic pressure signal against the target pressure, and iteratively increasing the target pneumatic pressure if the hydraulic pressure signal is less than the target pressure.

A further embodiment of the foregoing control system, wherein the control signal output by the control circuitry to the pneumatic regulator varies in voltage or amperage, the voltage or amperage level of the control signal linearly correlated with a target pressure level of hydraulic fluid output by the pump, the control circuitry varying the voltage or amperage level of the control signal to build hydraulic pressure output by the pump to the target pressure.

A further embodiment of the foregoing control system, further comprising a housing, wherein the pneumatic regulator and the control circuitry are located within the housing, and the inlet and outlet ports are mounted to the housing.

A further embodiment of the foregoing control system, wherein the pump and the pressure transducer are located outside of the housing.

A further embodiment of the foregoing control system, wherein the control circuitry is configured to control the pneumatic regulator to meter pressurized air to the pump to conduct a pressure test of the closed vessel.

A further embodiment of the foregoing control system, wherein the control circuitry is configured to modulate the control signal to stall the pump at the test pressure due to pneumatic pressure input to the pump balancing the hydraulic pressure of the fluid output by the pump.

A further embodiment of the foregoing control system, wherein the control circuitry is configured to control the pneumatic regulator to iteratively increase the pressure of the pressurized air output by the pneumatic regulator and measure the resultant hydraulic pressure output by the pump.

A further embodiment of the foregoing control system, wherein the control circuitry is configured to stop the output of pressurized air from the pneumatic regulator to the pump after the hydraulic pressure transducer indicates that the measured hydraulic pressure is greater than the test pressure.

A further embodiment of the foregoing control system, wherein the control circuitry is configured to monitor the measured hydraulic pressure as indicated by the hydraulic pressure transducer over time, while the output of pressurized air from the pneumatic regulator to the pump is stopped, to determine if the measured hydraulic pressure has dropped below the test pressure.

A further embodiment of the foregoing control system, wherein the control circuitry is configured to increment the target pressure above the test pressure if the measured hydraulic pressure dropped below the test pressure and resume the output of pressurized air from the pneumatic regulator to the pump.

A further embodiment of the foregoing control system, wherein the control system is configured to overshoot the pneumatic pressure output by the pneumatic regulator to cause the pump to overshoot the test pressure to account for pressure loss after the output of pressurized air from the pneumatic regulator to the pump is ceased such that the overshoot and the pressure loss results in the hydraulic pressure stabilizing above the test pressure after the output of pressurized air from the pneumatic regulator to the pump is stopped.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure testing system for pressurizing and testing a test vessel using a pump driven by pneumatic pressure and having a pressurized hydraulic fluid outlet to the test vessel, the pressure testing system comprising: a hydraulic pressure transducer configured to be coupled to the hydraulic fluid outlet to generate a hydraulic pressure signal indicative of the hydraulic pressure at the test vessel; and a pneumatic control unit configured to drive the pump via a supply of pressurized air from a pneumatic source, the pneumatic control unit comprising: a pressurized air inlet from the pneumatic source, and a pressurized air outlet to the pump; a pneumatic regulator disposed between the pressurized air inlet and the pressurized air outlet to modulate a pneumatic pressure of the pressurized air toward a target pneumatic pressure by metering airflow from the pressurized air inlet to the pressurized air outlet; control circuitry configured to receive the hydraulic pressure signal, set the target pneumatic pressure based on a target hydraulic pressure at the test vessel, and iteratively increase the target pneumatic pressure until the hydraulic pressure signal exceeds the target hydraulic pressure; wherein the pneumatic regulator comprises a pneumatic valve, the pneumatic valve disposed between the pressurized air inlet and the pressurized air outlet and actuatable open or close in response to a control signal from the control circuitry; a pneumatic pressure transducer disposed between the pneumatic valve and the pump to sense a pneumatic pressure of the pressurized air provided by the pneumatic control unit to the pump; and wherein the pneumatic regulator is configured to iteratively adjust a position of the pneumatic valve based on a comparison of the sensed pneumatic pressure with the target pneumatic pressure, independently of the target hydraulic pressure or the sensed hydraulic pressure.

2. The pressure testing system of claim 1, wherein the pump is an intensifier pump, and wherein the control circuitry is further configured to receive pump data reflecting an intensification ratio of the pump.

3. The pressure testing system of claim 2, wherein setting the target pneumatic pressure based on the target hydraulic pressure comprises determining a pneumatic pressure corresponding to the target hydraulic pressure, based on the intensification ratio.

4. The pressure testing system of claim 2, further comprising an operator interface disposed to input the pump data to the control circuitry, and configured to output test results to an operator.

5. The pressure testing system of claim 1, further comprising a hydraulic valve actuatable to fluidly isolate the pump from a fluid circuit including both the test vessel and the hydraulic pressure transducer.

6. The pressure testing system of claim 1, wherein the pump is driven entirely by the pressurized air.

7. A pressure testing system for pressurizing and testing a test vessel using a pump driven by pneumatic pressure and having a pressurized hydraulic fluid outlet to the test vessel, the pressure testing system comprising:

a hydraulic pressure transducer configured to be coupled to the hydraulic fluid outlet to generate a hydraulic pressure signal indicative of hydraulic pressure at the test vessel; and
a pneumatic control unit configured to drive the pump via a supply of pressurized air from a pneumatic source, the pneumatic control unit comprising:
  a pneumatic regulator disposed to modulate a pneumatic pressure of the pressurized air toward a target pneumatic pressure, wherein the pneumatic regulator comprises a pneumatic valve disposed between a pressurized air inlet and a pressurized air outlet;
  a pneumatic pressure transducer disposed between the pneumatic valve and the pump to sense a pneumatic pressure of the pressurized air provided by the pneumatic control unit to the pump; and
  control circuitry configured to receive the hydraulic pressure signal, set the target pneumatic pressure based on a target hydraulic pressure at the test vessel, and iteratively increase the target pneumatic pressure until the hydraulic pressure signal exceeds the target hydraulic pressure;
  wherein the pneumatic regulator is configured to iteratively adjust a position of the pneumatic valve based on a comparison of the sensed pneumatic pressure with the target pneumatic pressure, independently of the target hydraulic pressure or the sensed hydraulic pressure.

8. A pressure testing system for pressurizing and testing a test vessel using a pump driven by pneumatic pressure and having a pressurized hydraulic fluid outlet to the test vessel, the pressure testing system comprising:

a hydraulic pressure transducer configured to be coupled to the hydraulic fluid outlet to generate a hydraulic pressure signal indicative of hydraulic pressure at the test vessel; and
a pneumatic control unit configured to drive the pump via a supply of pressurized air from a pneumatic source, the pneumatic control unit comprising:
  a pneumatic regulator disposed to modulate a pneumatic pressure of the pressurized air toward a target pneumatic pressure by metering airflow of the pressurized air to the pump via a pneumatic valve;
  a pneumatic pressure transducer disposed between the pneumatic regulator and the pump to sense a pneumatic pressure of the pressurized air provided by the pneumatic control unit to the pump; and
  control circuitry configured to receive the hydraulic pressure signal, set the target pneumatic pressure based on a target hydraulic pressure at the test vessel, and iteratively increase the target pneumatic pressure until the hydraulic pressure signal exceeds the target hydraulic pressure;
  wherein the pneumatic regulator is configured to iteratively adjust the position of the pneumatic valve based on a comparison of the sensed pneumatic pressure with the target pneumatic pressure, independently of the target hydraulic pressure or the sensed hydraulic pressure.

* * * * *